June 27, 1972  J. E. BYRNE  3,672,785
CIRCULAR SAWING TOOL
Filed June 24, 1970
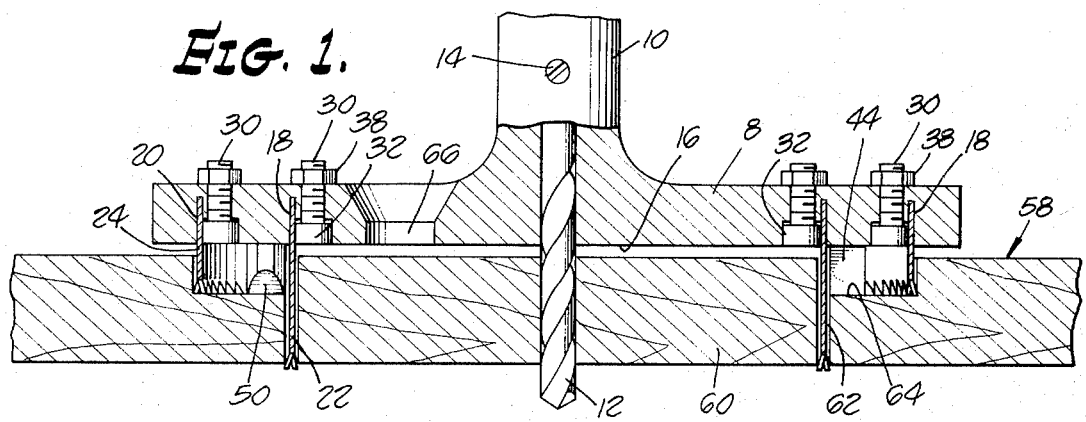
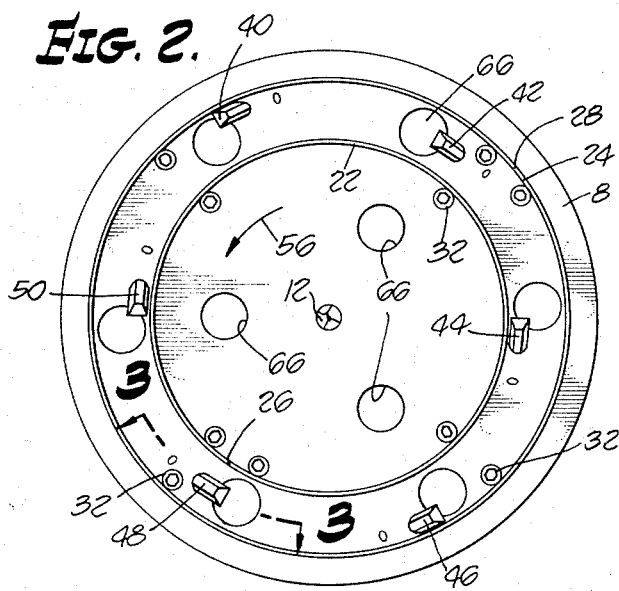
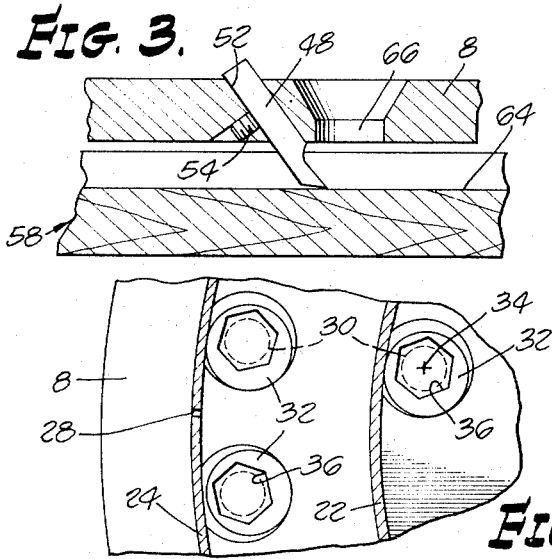
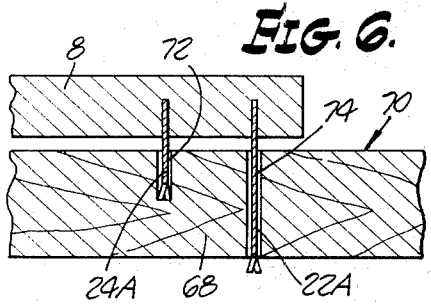
INVENTOR
JOSEPH E. BYRNE
BY
Alant Lefockabee
ATTORNEY

United States Patent Office 3,672,785
Patented June 27, 1972

3,672,785
CIRCULAR SAWING TOOL
Joseph E. Byrne, 38623 E. 21st St.,
Palmdale, Calif. 93550
Filed June 24, 1970, Ser. No. 49,391
Int. Cl. B27b 33/18
U.S. Cl. 408—206
2 Claims

ABSTRACT OF THE DISCLOSURE

A circular sawing device particularly for wood and other fibrous materials, as well as plastics, comprising a rotary body carrying at least a pair of concentric circular saw blades directed axially of the body and a pilot drill on the axis of rotation, wherein one circular blade is of lesser axial extent than the other, and whereby a circular opening with a rabbeted edge can be provided in one arrangement and in another blade arrangement, a circular disc with an inwardly concentric groove can be produced. Different adjustments of the blades can provide for various types of cuts other than the two mentioned.

---

This invention relates to a circular sawing device and is particularly adapted for use on wood and other fibrous materials, but need not necessarily be limited thereto.

One type of work which can be produced with my device is a circular opening defined by a rabbeted edge for the reception of sound speakers for radios, televisions, high fidelity systems and the like. Another specific use with a different blade arrangement is to form ends for devices such as cylindrical lamps, wherein the ends are grooved to receive in the grooves the ends of a cylinder of glass or other plastic material.

While I have specifically mentioned two uses for the device and will describe it in connection with those two uses, it is contemplated that it may of course be used for the production of other items.

Other types of cutting means have been used for producing articles of this type. Of those known to me they fall into two general categories. One is a rotary cutter body with customarily a pair of blades located on a circle 180° apart. These devices, while they perform after a fashion, do not provide continuous cutting entirely about the circle. Also, they have not been provided with means for cutting on concentric circles at different depths which are adjustable to produce cuts of different varieties. Another type of cutter, particularly for the rabbeted sound speaker opening mentioned above, comprises a template and a router. Customarily, the template is made of a fairly soft material which the router quickly cuts out-of-round so the resulting aperture will not be round. Also, any openings for sound speakers are conventionally formed in chipboard which comprises wood particles glued together and molded. It is extremely difficult, if not impossible, to secure smooth cuts in chipboard with a router or with the above mentioned rotary cutters with relatively narrow blades spaced 180° apart.

In actual practice heretofore, the template and router equipment has nearly universally been used, and any chipboard router bits will dull and burn after ten or fifteen uses in cutting through ½" chipboard to produce openings averaging approximately 8" in diameter. A device embodying the invention herein has been used by me to produce over 100 cuts of rabbeted edge speaker openings and the tool is still in completely satisfactory condition.

With the conventional cutting tools used heretofore, it has been necessary to perform two separate cuts at separate times to produce a circular opening defined by a rabbeted edge. With my tool, the circular cutout and the rabbeted edge can be produced simultaneously.

My invention contemplates the use of a pair of concentric saw blades extending a full 360° so that there is cutting being performed entirely about the circle at all times. A smooth cut is produced and the blades are not subject to damage from heat, as in the case of router blades because of their 360° continuity and the resultant ability to dissipate heat more readily. Furthermore, the smoother and more accurate cut produced by my tool, particularly with respect to sound speaker apertures is highly important because of the fact that the speaker cabinet opening is supposed to fit the face plate of the speaker so closely that an airtight seal can be made. This is quite important because all sound speaker enclosures of any quality at all are airtight so that when the speaker expands or vibrates inwardly into the enclosure, the air therein will be slightly compressed to provide an air cushion return for the speaker diaphragm to its proper position.

The above and other objects of the invention will more fully appear from the following description made in connection with the accompanying drawing:

FIG. 1 is a vertical sectional view through an embodiment of my invention shown in conjunction with the work upon which it operates;

FIG. 2 is a bottom plan view, on a reduced scale, of the apparatus in FIG. 1;

FIG. 3 is an enlarged sectional detail taken approximately on the line 3—3 of FIG. 2;

FIG. 4 is an enlarged detail of the blade anchoring means, the two blades being shown in section;

FIG. 5 is a partial bottom plan view of another embodiment of the invention;

FIG. 6 is an enlarged sectional detail of a different arrangement of cutting blades.

The tool includes a body 8 preferably in the form of a circular disc having a central shaft 10 by means of which it can be mounted and rotated, the shaft 10 supporting a pilot drill 12 whose shank is secured by a setscrew 14, the drill extending a substantial distance outwardly from the flat face 16 of the disc 8.

The body or disc 8 is provided with circular concentric grooves 18 and 20 which are adapted to removably receive circularly arranged saw blades 22 and 24, said saw blades being concentrically spaced by reason of the similar arrangement of their grooves 18 and 20. In FIG. 2 the inner blade 22 is shown with closely positioned ends at 26. At this point the blade ends may be merely closely positioned or the blades may be provided in a continuous loop with the ends welded at the point 26. A similar junction 28 is shown for the blade 20.

Adjacent the grooves 18 and 20 are bolts 30 which extend through the body or disc 8. They are provided with countersunk heads 32 which as shown best in FIG. 4, are eccentric to the bolt axes 34. The bolt heads are provided with hexagonal countersinks 36 and when they are properly rotated by a suitable wrench, the cam shaped heads 32 will exert pressure against the blades 22 and 24, pressing the blades against the side walls of the slots 18 and 20 and holding them firmly in position. When the blades are thus retained, nuts 38 on the bolts 30 will releasably secure the nut cams 32 in a tightened position.

In FIG. 2 there is illustrated a series of chipper teeth 40, 42, 44, 46, 48 and 50. The tooth 48 is illustrated in FIG. 3 as being removably received in a slot or hole 52 in the rotatable body 8 and held in position by a suitable setscrew 54. It will be observed that the chipper tooth 40 lies immediately beside the outer circular saw blade 24, and the tooth 50 lies immediately beside the inner saw blade 22 with teeth 42, 44, 46, and 48 lying on a spiral line joining the outer tooth 40 and the innermost tooth 50. Thus, when the tool is rotated in the direction of the arrow 56, the chipper teeth will clear all of the work material from between the saw blades 22 and 24.

In FIG. 1 the inner circular saw blade 22 is shown extending from the face 16 of the rotary body 8 a considerably greater distance axially than the outer blade 24. Considering the workpiece 58 as being a piece of wood or chipboard, or the like, the pilot drill 12 first encounters the work and begins to form its hole. Then the inner circular saw blade 22 engages and begins cutting circularly into the work until it has passed completely through the work so that a circular work portion 60 is completely cut out of the main workpiece 58. As the drill 12 and longer inner circular saw 22 penetrates the work, the outer circular saw 24 which is of less axial extent, will begin to cut into the workpiece 58 outwardly concentric to the inner blade 22 and as the outer blade 24 performs its cut, the material of the workpiece between the circular blades will chip or cut out the material between the blades to provide a rabbeted portion which will define a circular opening 62 in the workpiece 58. The outer circular saw 24 and chipper teeth 40–50 will cut a rabbet or corner 64 to a depth limited by contact of the face 16 of the rotary body or disc with the surface of the workpiece 58. The depth of the rabbet 64 can be varied by axially adjusting the position of the outer circular blade 24 in its groove 18. Likewise, the chipper teeth 48 can be adjusted in depth by means of the setscrew 54.

In order to clear sawdust and chips during the cutting operation, the tool body or disc 8 is provided with apertures 66, as indicated. Where precise depth of cut is required and there may possibly be some small accumulation of sawdust between the workpiece and the rotary body or disc, the tool can conveniently be mounted in a drill press provided with stop means so that the depth of cut will necessarily be uniform in succeeding pieces.

The circular saw blade arrangement of FIG. 1, as has been described, is intended for cutting a circular opening in a workpiece, the opening being defined by a rabbet. In FIG. 6 there is shown a reverse blade arrangement wherein a wider blade 22A is located concentrically outwardly from a narrower blade 24A. With this arrangement, a disc 68 is cut from a workpiece 70 and the cutout disc 68 is provided with a groove 72 inwardly concentric from the outer edge 74 of the disc. In this case the disc 68 is the item produced, and two of them may be used, for example, as top and bottom end pieces for a lamp whose side wall may be a cylinder of glass or plastic received in the circular groove 72.

FIG. 5 illustrates a modification wherein a spirally arranged saw blade 76, in a suitable spiral groove not shown, is anchored by cam bolts 78 similar to the bolts 30 of the previous embodiment. The chipper blade 76 extends through approximately 180° of the circular saw blades and serves to cut away the material between the two blades as do the chipper teeth 40–50 of the first embodiment.

It may be seen that I have provided a circular sawing tool which will perform multiple operations simultaneously with extreme accuracy and which can be utilized with work material, such as chipboard, to provide smooth, precise cuts without undesirable breaking away adjacent portions of the work, and wherein the cutting is performed by a large number of saw teeth as distinguished from a router bit, so that wear is distributed over a much greater tool cutting edge, and wherein a continuous circular blade readily dissipates heat and prevents premature dulling. As stated above, the tool is, among other things, quite useful in the forming of sound speaker openings for speaker boxes or cabinets where the openings are defined by rabbeted portions which are sufficiently smooth to permit sealing of the edge of the speaker therein, and thereby provide a speaker box of the highest quality. The circular saw blades are axially adjustable and different operations can be performed by utilizing blades of different widths.

It will of course be understood that various changes can be made in the form, details, arrangement and proportions of the various parts without departing from the spirit of the invention.

I claim:

1. A circular sawing device comprising a rotary body and means for maintaining the body on center relative to a piece of work, wherein the improvement comprises: a pair of saw blades secured to and extending axially from said body on circular lines in concentric spaced relationship, means between said blades for cutting away portions of the work between the cuts produced by said blades, and said body having circular blade receiving slots therein, blade securing bolts rotatably carried by said body adjacent said slots, and said bolts having cam portions engageable with adjacent blade portions to releasably clamp the blades in the slots.

2. A circular sawing device comprising a rotary body and means for maintaining the body on center relative to a piece of work, wherein the improvement comprises: a pair of saw blades secured to and extending axially from said body on circular lines in concentric spaced relationship, means between said blades for cutting away portions of the work between the cuts produced by said blades, and said body comprising a disc having concentric blade receiving grooves, and said disc having apertures therethrough between said blades and inwardly from the inner blade for the escape of work cuttings.

References Cited

UNITED STATES PATENTS

| | | | |
|---|---|---|---|
| 765,613 | 7/1904 | Dillman | 143—85 A UX |
| 1,283,258 | 10/1918 | Misener et al. | 143—85 A UX |
| 194,221 | 1877 | Clarkson | 143—85 UX |
| 2,599,770 | 6/1952 | Marcerou | 143—85 A |
| 2,804,895 | 9/1957 | Clement | 408—225 X |

ANDREW R. JUHASZ, Primary Examiner

J. F. COAN, Assistant Examiner

U.S. Cl. X.R.

143—85 A; 408—226